O. A. OSMONDSON.
SPEED TRANSFORMER.
APPLICATION FILED APR. 17, 1919.

1,320,645.

Patented Nov. 4, 1919.
3 SHEETS—SHEET 1.

Witness

Inventor
O. A. Osmondson
By C. A. Snow & Co.
Attorneys

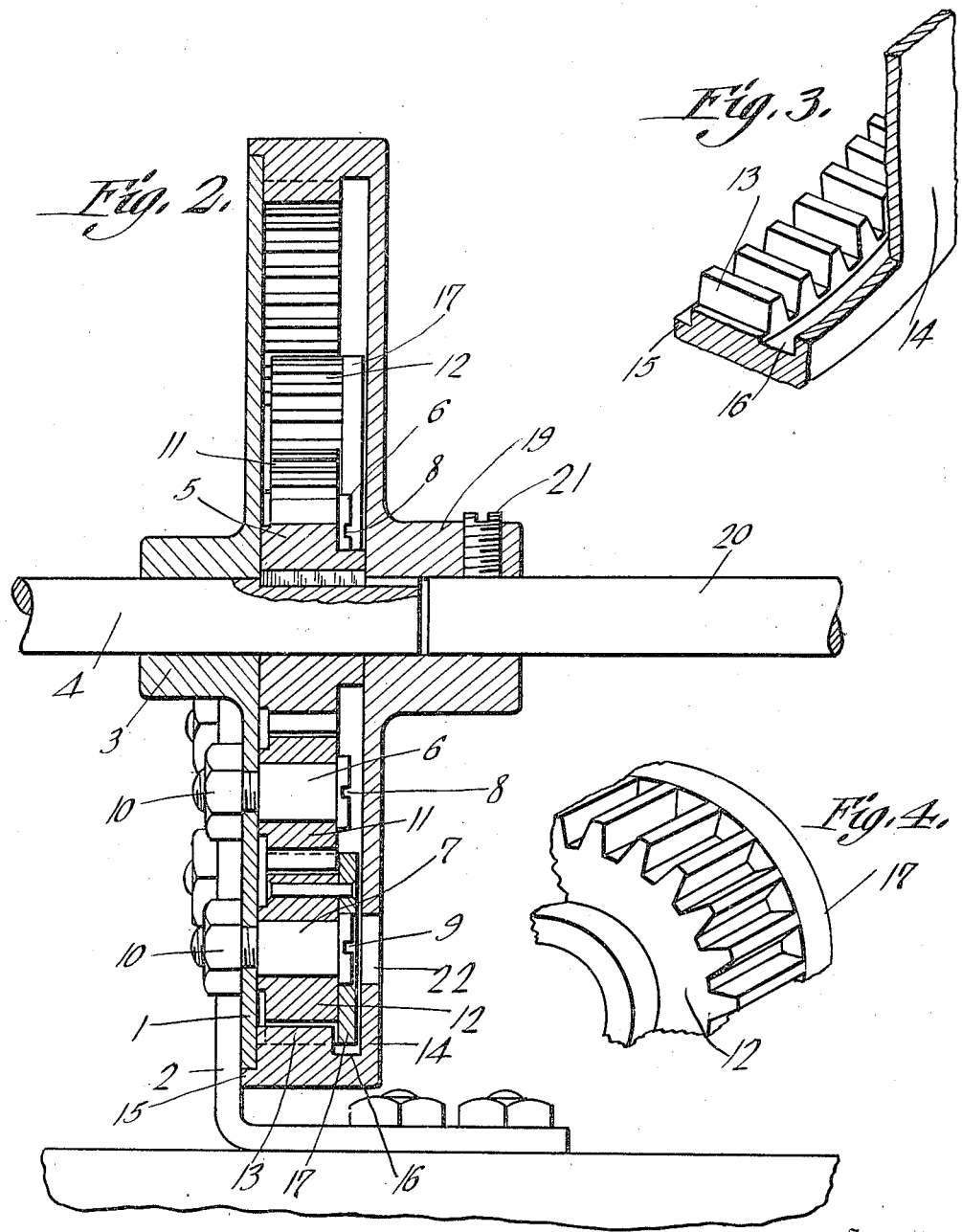

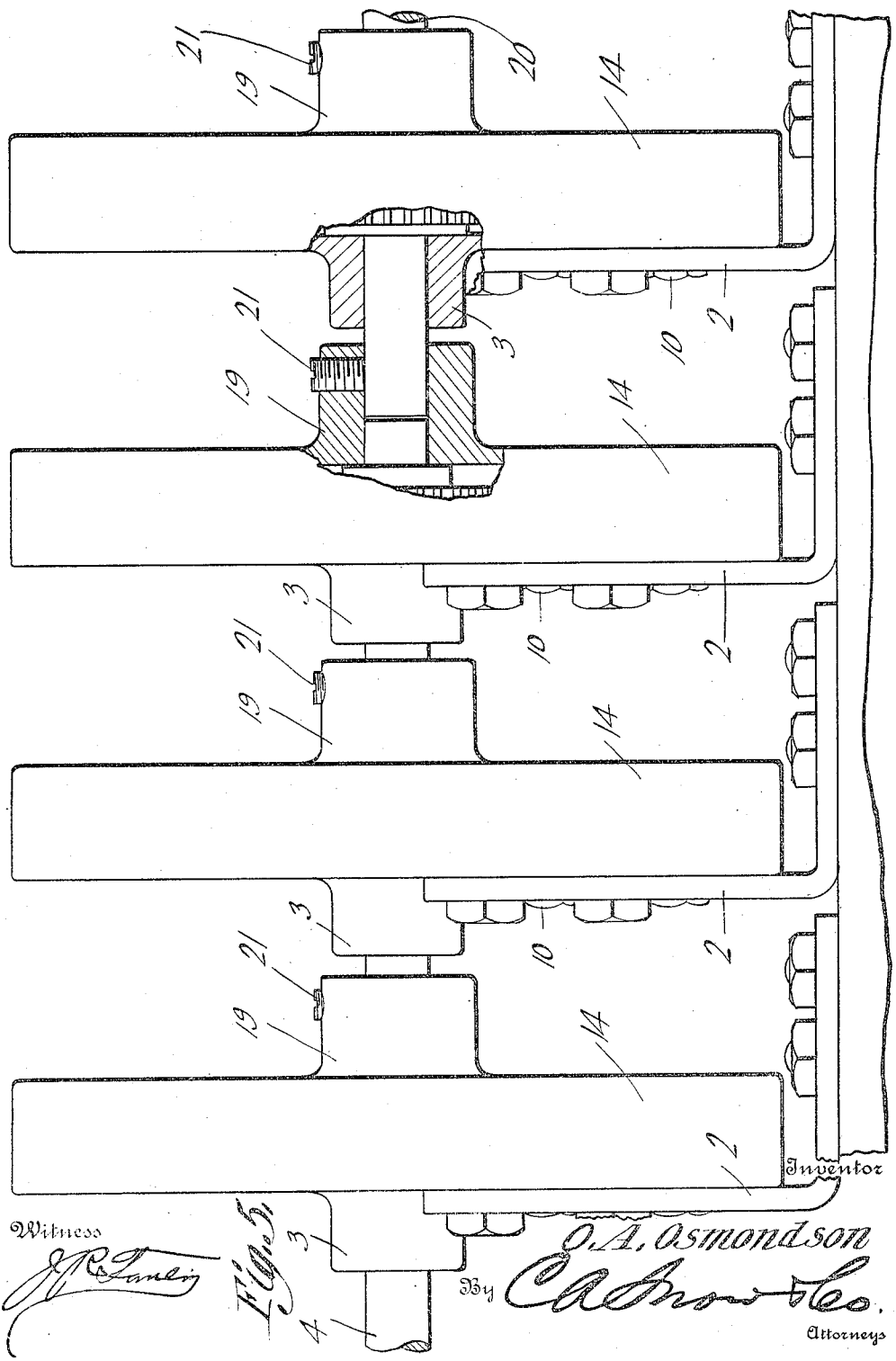

UNITED STATES PATENT OFFICE.

OSMOND A. OSMONDSON, OF CHICAGO, ILLINOIS.

SPEED-TRANSFORMER.

1,320,645.   Specification of Letters Patent.   Patented Nov. 4, 1919.

Application filed April 17, 1919. Serial No. 290,735.

*To all whom it may concern:*

Be it known that I, OSMOND A. OSMONDSON, a citizen of the United States, residing at Chicago, in the county of Cook and State of Illinois, have invented a new and useful Speed-Transformer, of which the following is a specification.

This invention relates to a speed transformer designed primarily for use with electric motors although it is equally suitable for use in connection with any other type of motor.

One of the objects of the invention is to provide an internal gear speed transformer which is simple, durable, compact and balanced, it being possible to maintain the same constantly lubricated so that it will run smoothly and be kept constantly at a high state of efficiency.

Another object is to provide a structure which can be combined readily with other like structures or units thereby to multiply or to reduce the speed, as desired.

A still further object is to provide a speed transformer utilizing idler gears interposed between the central gear and the internal or casing gear, there being radial pairs of these idler gears and one gear of each pair having means coöperating with the internal gear whereby the parts of the casing are held together.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the invention as set forth in the claims.

In the accompanying drawings the preferred form of the invention has been shown.

In said drawings—

Fig. 2 is a section on line 2—2, Fig. 1.

Fig. 3 is a detail perspective view of a portion of the internal gear.

Fig. 4 is a detail perspective view of a portion of one of the locking idler gears.

Fig. 5 is an elevation showing a plurality of units assembled, each unit being of the same construction as that shown in Figs. 1 and 2.

Figure 1:
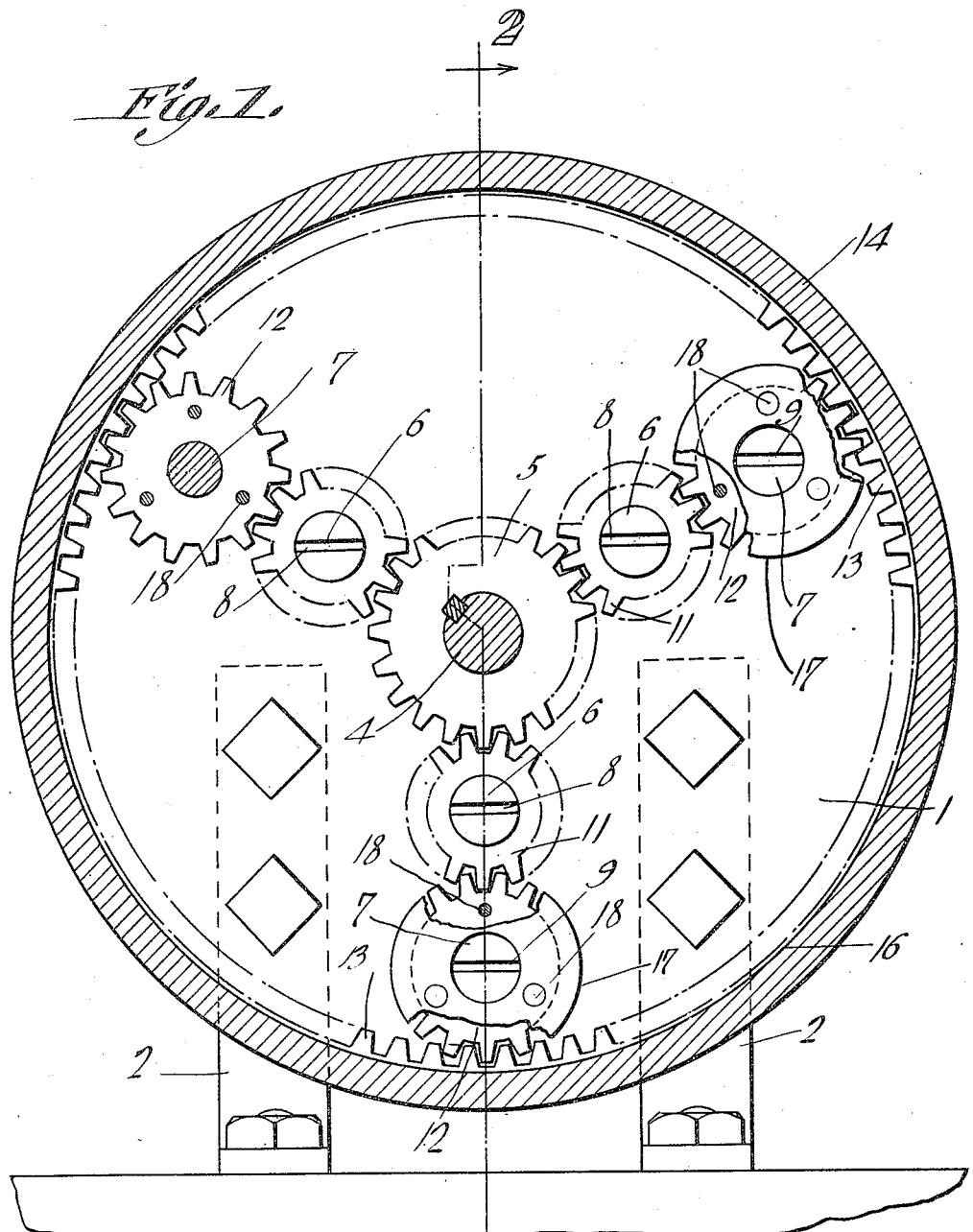
Figure 1 is a vertical transverse section through the mechanism.

Referring to the figures by characters of reference, 1 designates a stationary disk suitably mounted, as upon a bracket 2, and this disk has a central hub 3 in which is journaled one of the shafts of the transmission and which shaft has been indicated at 4. On this shaft is keyed or otherwise secured a central gear 5 and radiating from this gear are pairs of stud bolts 6 and 7 which are secured to the disk or head 1. A kerf 8 may be formed in the head of each of the bolts 6 but may be dispensed with if desired. Each of the heads of the bolts 7, however, is necessarily provided with a kerf 9, for the reason hereinafter stated. The bolts 6 and 7 are removably held to the disk 1 by nuts 10, as shown. Mounted for rotation on each of the bolts 6 is an idler gear 11 which meshes with the central gear 5. Another gear 12 is mounted for rotation on each of the stud bolts 7 and meshes with the adjacent gear 11. All of the gears 12 mesh with an internal gear 13 formed at the periphery of a disk or head 14 and abutting against the peripheral portion of the disk or head 1, there being a rib 15 on said internal gear at the side thereof which laps the margin of disk 1, as shown, thus to provide a seat therefor. The teeth of the internal gear 13 are spaced from the disk or head 14 thus to provide an annular channel or clearance 16 and projecting into this channel are the peripheral portions of flange rings 17 which are secured to the gears 12 by rivets 18 or the like. Thus as long as the bolts 7 are secured to the disk or head 1 the flanges 17 constitute means for tying the head 14 to the head 1 and preventing their separation.

The head 14 is provided with a hub 19 into which loosely extends one end of the shaft 4. Another shaft 20 of the transmission is secured within the hub 19 in any manner desired, as by means of a set screw 21, or the like.

From the foregoing description it will be apparent that when it is desired to multiply speed by means of the transformer herein described, the power is applied to the shaft 20 which will thus rotate the internal gear 13 which, in turn, will rotate the gears 12 and they, in turn, will transmit motion through the gears 11 and the central gear 5 to the shaft 4 which alines with shaft 20. By placing another transformer unit beside the one shown and utilizing the shaft 4 of the first unit as the drive shaft of the second unit the speed can be further increased. Obviously any desired number of units can be assembled in this manner and, when so assembled, will form a compact but efficient speed transformer. By applying power to the other side of the unit or series of units the speed will be reduced inasmuch as the gear 5 then becomes the driving gear and the internal gear 13 becomes the driven gear.

An opening 22 is formed in the head 14 and is so located that, by rotating said head the opening can be brought successively into line with the heads of the stud bolts 7. A screw driver can be inserted into the opening to successively engage the kerfs in the bolts 7 and while each of said bolts is thus held, the nut engaging the bolt can be unscrewed and the bolt thus released. After all of the bolts 7 have thus been unfastened, the head 14, being relieved of the restraining action of the flanges 17, can be pulled away from the head 1, carrying with it the gears 12. Thus access can be had readily to the interior of the structure.

The heads and the internal gear coöperate to form a housing for the mechanism and a lubricant can be placed in this housing to cause the parts to run smoothly. Under such conditions a suitable plug, not shown, can be placed in the opening 22.

What is claimed is:—

1. The combination with a housing including a stationary head, a revoluble head, and an internal gear at the margin of the revoluble head and frictionally engaging the stationary head, of a shaft journaled in the stationary head, a shaft alining therewith and secured to the revoluble head, a gear within the housing and secured to the first named shaft, meshing idler gears arranged in radial pairs within the housing and adapted to transmit motion between the internal gear and the gear on the shaft, and means upon the outer idler gears and coöperating with the internal gear for holding the heads against separation.

2. The combination with a stationary head, of a shaft journaled therein, a revoluble head, a shaft secured thereto and alining with the first named shaft, a gear upon the first named shaft and between the heads, an internal gear upon the revoluble head and engaging the stationary head, said heads and internal gear forming a housing, idler gears secured to the stationary head and meshing with the gear on the shaft, gears secured to the stationary head for transmitting motion between said idler gears and the internal gear, there being an interior channel between the internal gear and its head, and a tying flange upon each of the gears meshing with the internal gear; said flanges working within the channel to hold the heads against separation.

3. The combination with a stationary head, of a shaft journaled therein, a revoluble head, a central gear between the heads and secured to the shaft, a shaft secured to the revoluble head, an internal gear upon the revoluble head and coöperating with both heads to form a housing, there being an interior annular channel between said internal gear and its revoluble head, idler gears mounted in the housing and on the stationary head and meshing with the central gear, gears for transmitting motion between the idler gears and the internal gear, bearing studs within said last named gears and detachably secured to the stationary head, said studs having tool engaging heads, and means upon said last named gears and coöperating with the channel for tying the heads together, there being an opening within the revoluble head and movable successively into position to guide a tool into engagement with the respective removable studs.

In testimony that I claim the foregoing as my own, I have hereto affixed my signature in the presence of two witnesses.

OSMOND A. OSMONDSON.

Witnesses:
  August J. Heise,
  Harold Wells.

Copies of this patent may be obtained for five cents each, by addressing the "Commissioner of Patents, Washington, D. C."